US012603934B2

(12) United States Patent
Udaya et al.

(10) Patent No.: US 12,603,934 B2
(45) Date of Patent: Apr. 14, 2026

(54) SYSTEMS AND METHODS FOR SCHEDULING PACKAGES TO SYNCHRONIZE CONTENT ACROSS COMPUTER SYSTEMS

(71) Applicant: SAP SE, Walldorf (DE)

(72) Inventors: Sahana Durgam Udaya, Bangalore (IN); Pranav Kumar, Bangalore (IN)

(73) Assignee: SAP SE, Walldorf (DE)

( * ) Notice: Subject to any disclaimer, the term of this patent is extended or adjusted under 35 U.S.C. 154(b) by 125 days.

(21) Appl. No.: 18/531,332

(22) Filed: Dec. 6, 2023

(65) Prior Publication Data

US 2025/0193277 A1      Jun. 12, 2025

(51) Int. Cl.
*G06F 15/16* (2006.01)
*H04L 67/1095* (2022.01)

(52) U.S. Cl.
CPC .............................. *H04L 67/1095* (2013.01)

(58) Field of Classification Search
CPC .................................................... H04L 67/1095
See application file for complete search history.

(56) References Cited

U.S. PATENT DOCUMENTS

| | | | |
|---|---|---|---|
| 6,564,261 B1 | 5/2003 | Gudjonsson et al. | |
| 2002/0083124 A1 | 6/2002 | Knox et al. | |
| 2005/0203887 A1 | 9/2005 | Joshi et al. | |
| 2007/0156633 A1 | 7/2007 | Sugita | |
| 2009/0037373 A1 | 2/2009 | Gilbert | |

| | | | |
|---|---|---|---|
| 2009/0254572 A1 | 10/2009 | Redlich et al. | |
| 2010/0250497 A1 | 9/2010 | Redlich et al. | |
| 2012/0030167 A1* | 2/2012 | Appiah .................. G06F 16/214 | |
| | | | 707/610 |
| 2012/0185448 A1 | 7/2012 | Mensch et al. | |
| 2013/0139241 A1 | 5/2013 | Leeder | |
| 2013/0159062 A1 | 6/2013 | Stiehl | |

(Continued)

FOREIGN PATENT DOCUMENTS

| | | |
|---|---|---|
| CN | 115063026 A | 9/2022 |
| GB | 2375006 A1 | 10/2002 |

(Continued)

OTHER PUBLICATIONS

The extended European search report of Application No. 24210027.9 dated May 12, 2025. 13 pages.

(Continued)

*Primary Examiner* — Padma Mundur
(74) *Attorney, Agent, or Firm* — Fountainhead Law Group, PC

(57) ABSTRACT

Embodiments of the present disclosure include techniques for moving data. In one embodiment, a schedule definition is defined on one system and sent to an associated CMS. The schedule definition may include a target, objects or packages, source, and time or event to start the transport of associated content. When the time or event occur, the associated CMS retrieves the content from the backend application server and sends an event to another CMS associated with the target backend application server. The content is transported from the associated CMS to the target backend application automatically. Content may be moved automatically between a plurality of systems to synchronize content across a content network.

18 Claims, 11 Drawing Sheets

(56) References Cited

U.S. PATENT DOCUMENTS

| | | | |
|---|---|---|---|
| 2013/0191519 A1 | 7/2013 | Chang et al. | |
| 2013/0262392 A1 | 10/2013 | Vibhor et al. | |
| 2014/0359576 A1 | 12/2014 | Rath et al. | |
| 2015/0074286 A1 | 3/2015 | Anschutz | |
| 2015/0120649 A1 | 4/2015 | Nakadai | |
| 2015/0236907 A1* | 8/2015 | Popli | H04L 43/0817 |
| | | | 709/226 |
| 2016/0110828 A1 | 4/2016 | Master et al. | |
| 2017/0195373 A1 | 7/2017 | Toh et al. | |
| 2018/0081905 A1 | 3/2018 | Kamath et al. | |
| 2019/0303445 A1 | 10/2019 | Padmanabhan | |
| 2020/0092177 A1 | 3/2020 | Marvin et al. | |
| 2020/0118330 A1 | 4/2020 | Connelly et al. | |
| 2020/0242481 A1 | 7/2020 | Kim et al. | |
| 2021/0058447 A1 | 2/2021 | Trufasiu et al. | |
| 2021/0109862 A1 | 4/2021 | Yang et al. | |
| 2021/0134407 A1 | 5/2021 | Vera-Ciro et al. | |
| 2021/0168128 A1 | 6/2021 | Carru et al. | |
| 2021/0385252 A1 | 12/2021 | Lebin et al. | |
| 2021/0399877 A1 | 12/2021 | Ohashi et al. | |
| 2021/0406397 A1 | 12/2021 | Brazeau et al. | |
| 2022/0027509 A1 | 1/2022 | Amico | |
| 2022/0076240 A1 | 3/2022 | Ghani et al. | |
| 2022/0245290 A1 | 8/2022 | Luciani | |
| 2023/0007483 A1 | 1/2023 | Mueck et al. | |
| 2023/0098596 A1 | 3/2023 | Karri et al. | |
| 2024/0069234 A1 | 2/2024 | Meenakshi Sundaram Gandhi et al. | |
| 2024/0419456 A1 | 12/2024 | Eberlein | |

FOREIGN PATENT DOCUMENTS

| | | |
|---|---|---|
| JP | 2008-084182 A2 | 4/2008 |
| JP | 4444518 B2 | 3/2010 |

OTHER PUBLICATIONS

Bigstar: "Site to site transfers (FXP)—1-15 INV. Flash FXP Forums", H04L9/40, Apr. 22, 2014 (Apr. 22, 2014), pp. 1-2, XP093246533, The Way back machine Retrieved from the Internet: URL:https://web.archive.org/web/20140718041834/https://www.flashfxp.com/forum/flashf xp/frequently-asked-questions-faq-/14656-site-site-transfers-fxp.html [retrieved on Feb. 4, 2025].

Cppcis231: "How to FTP and FXP", 1-15, Mar. 5, 2012 (Mar. 5, 2012), XP093246544, Retrieved from the Internet: URL:https://www.youtube.com/watch?v=6XXQge RWWRw [retrieved on Feb. 4, 2025].

The extended European search report of Application No. 24206608.2 dated Mar. 10, 2025. 6 pages.

Stefan Momma, Enterprise Content Management for SAP, Redbooks,50 pages Sep. 15, 2015. (Year: 2015).

\* cited by examiner

SYSTEMS AND METHODS FOR SCHEDULING PACKAGES TO SYNCHRONIZE CONTENT ACROSS COMPUTER SYSTEMS

CROSS REFERENCE TO RELATED APPLICATIONS

This application is related to, and concurrently filed with, U.S. patent application Ser. No. 18/531,289 (Unassigned; entitled "SYSTEMS AND METHODS FOR PARALLEL TRANSPORT OF DATA BETWEEN COMPUTER SYSTEMS", naming Sahana Durgam Udaya and Suneel Sristi as inventors, filed on Dec. 6; 2023, the disclosure of which is hereby incorporated herein by reference.

This application is related to, and concurrently filed with, U.S. patent application Ser. No. 18/531,384 (Unassigned; entitled "SYSTEMS AND METHODS FOR AUTHORIZED MOVEMENT OF INFORMATION BETWEEN COMPUTER SYSTEMS", naming Sahana Durgam Udaya as inventor, on Dec. 6, 2023, the disclosure of which is hereby incorporated herein by reference.

This application is related to, and concurrently filed with, U.S. patent application Ser. No. 18/531,354 (Unassigned; entitled "SYSTEMS AND METHODS FOR COPYING DATA BETWEEN COMPUTER SYSTEMS", naming Sahana Durgam Udaya, Soumya Basavaraju, Abhishek Nagendra, Ashokkumar Kandasamy Narayanan, and Mickey Wong as inventors, filed on Dec. 6, 2023, the disclosure of which is hereby incorporated herein by reference.

This application is related to, and concurrently filed with, U.S. patent application Ser. No. 18/531,369 (Unassigned; entitled "SYSTEMS AND METHODS FOR STORING AND RETRIEVING PUBLIC DATA", naming Sahana Durgam Udaya as inventor, filed on Dec. 6, 2023, the disclosure of which is hereby incorporated herein by reference.

BACKGROUND

The present disclosure relates generally to software systems, and in particular, to systems and methods for scheduling packages to synchronize content across computer systems.

Computer systems require data to produce useful and meaningful results. Data preparation and analytics can involve complex, time consuming preparation of relations, visualizations, and compilations of data. When data is prepared in such a way, it may be beneficial to share the data across multiple computer systems. However, moving complex data structures across different systems can be a challenge.

The present disclosure addresses these and other challenges and is directed to techniques for automating the movement of data across computer systems.

DETAILED DESCRIPTION

Described herein are techniques for automated movement of data across computer systems. For example, embodiments of the present disclosure include automated movement of the data to ensure that multiple target system are in sync with the latest contents created in a source system. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
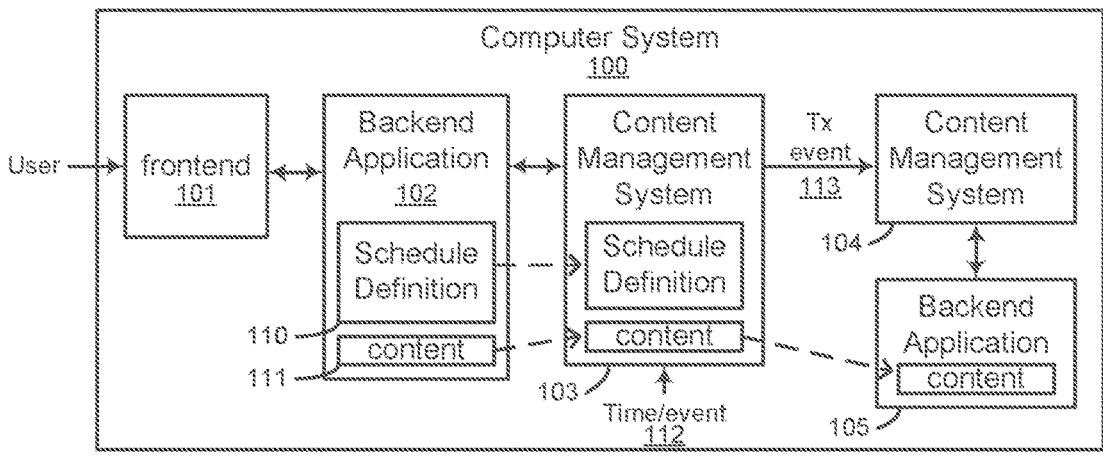
FIG. 1 illustrates a system for automated movement of data across computer systems according to an embodiment.

FIG. 1 illustrates a system for automated movement of data across computer systems according to an embodiment. Features and advantages of the present disclosure include techniques for automating movement of data across computer systems. The present techniques may be applied to a wide range of software systems deployed on a variety of architecture. For example, in some embodiments, computer system 100 may include on-prem deployments of applications, cloud deployments of applications, or combinations thereof. Computers may execute software applications directly or the computers may execute virtual machines that, in turn, execute software applications (or combinations thereof). In various embodiments, computers may reside in the same location or be spread out across geographic regions.

Computer system 100 may include numerous computers executing multiple software modules. Here, a user may interface with system 100 through a frontend 101 of a software application. Frontend 101 may interface with a backend application 102. For example, user interaction with functionality of a backend application may be through the frontend, which may provide a user interface. Backend application 102 may include software logic for performing a wide range of functions specific to the particular application and may further include a database system (not shown) for storing application data. Example backend applications include the Concur® software application and the Success-factors® software application by SAP®. Backend application 102 may support numerous frontends. A particular backend application may be deployed on multiple computer servers to provide compute resources for potentially many users. Different instances of an application (frontends and backends) may be created for different groups of users (e.g., companies or other organizations) and are sometimes referred to as "tenants."

Backend application 102 may be coupled to a content management system 103. Content management system 103 may store content to be shared across multiple backend applications 102 (e.g., for a particular tenant or across tenants). For example, a user may create certain complex data structures or relationships (e.g., analytic content) and want to share the content with other users who may not be working off of backend application 102. Accordingly, a user may cause backend application 102 to store the content in content management system 103. Further, a user may access content created by other users by retrieving content from content management system 103. Examples of importing and exporting content between a backend application and a content management system are provided in more detail below.

Content management system 103 may be coupled to one or more additional content management systems that are associated with other backend applications. Collections of content management systems allow users across a wide range of software systems to share content and are sometimes referred to as a content network. One example content network is an analytic content network for sharing analytic content described in more detail below.

Features and advantages of the present disclosure include automated movement of data across computer systems. As the size and number of users of a content network increases, managing the flow of content across the content network can become computationally intensive and time consuming. Embodiments of the disclosure efficiently automate the process resulting is more efficient usage of resources. For example, a user may create and store content 111 on backend application 102. Content to be distributed may be new content or updates of existing content, for example. Advantageously, a scheduling definition 110 may be specified and stored on backend application 102. Scheduling definition 110 may comprise a source definition, a target definition, and one of a time or event. For example, the source definition may define the source of the content (e.g., a URL to content management system 103). The target definition may define the target where the content is to be moved (e.g., a URL to backend application 105). In various embodiments, schedule definitions may comprise a time or an event. A time may cause content to be automatically moved to another system at certain times (e.g., times of the day, days of the week, days of a month, or various combinations thereof). In other embodiments, the schedule definition may comprise an event. Events may cause content to be automatically moved to another system upon detection of a certain event (e.g., content is placed in a particular location, such as a release folder or directory). Scheduling definition 110 may be associated with particular content to be moved, for example, such that when the scheduling definition is executed, particular content is automatically transported to a different system.

Once the schedule definition 110 is created, it may be sent from backend application 102 to the associated content management system 103. Content management system 103 may execute the scheduling definition and detect the time or event 112 set in schedule definition 110. In response to detecting the configured time or event 112, content management system 103 transports a content package from backend application 102 to content management system 103 associated with backend application 102. A content package is a compilation of the content in a form suitable for movement between systems. Example content packages are illustrated below. Additionally, content management system 103 sends a transport (Tx) event 113 from content management system 103 to another content management system 103 associated with a backend application 105 specified as the target in the schedule definition. Content management system 104 associated with the target backend application 105 may receive the transport event 113. In response to transport event 113, content package 111 is transported from content management system 103 to backend application 105. For example, in certain embodiments described further below, content management system 104 retrieves the content package 111 from content management system 103 and the content package 111 is sent from content management system 104 to the associated backend application 105.

As mentioned above, scheduling definition 110 may comprise a time or event specified by a user. When scheduling definition 110 comprises a user specified time, backend application 102 detects the user specified time. In response to detecting the user specified time, the content package 111 is transported from backend application 102 to content management system 103 and the transport event 113 is sent to content management system 104. As mentioned above, the user specified time causes backend application 102 to transport the content package 111 and send the transport event 113 at regular time intervals. Similarly, when scheduling definition 110 comprises a user specified event, backend application 102 detects the user specified event. In response to detecting the user specified event, the content package 111 is transported from backend application 102 to content management system 103 and the transport event 113 is sent to content management system 104. As mentioned above, the user specified event causes backend application 102 to transport the content package 111 and send the transport event 113 automatically in response to events, which may be defined by users. Content management system 103 may be configured to listen for events taking place on associated backend applications, and when backend applications trigger the events, content management system may automatically trigger an automated movement of content packages associated with the events in the schedule definition. For example, an event listener may be implemented in the content management. In the case of an event-based schedule, an event to which the event listener will listen to may be defined in the CMS. When the event occurs, the schedule is triggered and performs the export and/or import. In the present example, an event listener listens for file events (e.g., events related to file activity), and when the file event occurs, the event listener listens to the event and triggers the schedule. For example, an event listener is recursively looking for a file name "file_1" in the application folder, when the "file_1" gets added in the application folder the event listener listens to this "file event" and triggers the schedule.

Accordingly, content 111 may be distributed across a content network automatically, allowing for more efficient content distribution (e.g., content distribution may be batched and performed in ways that are more computationally efficient. One advantage of the present technique pertains to process optimization. For example, the disclosed process may (1) eliminate the dependency on the user from performing same manual job on regular basis and (2) Customers/Partners have hundreds of systems (where content has to be transported) the present techniques avoid human errors while keeping these systems in sync. Further, the present techniques improve resource optimization by (1) avoiding duplicate package creation—as schedule will check for package containing object before creating one (e.g., saving storage space and resources) and by (2) scheduling transport during non-business hours to reduce load during peak hours resulting in efficient resource utilization.

Figure 2:
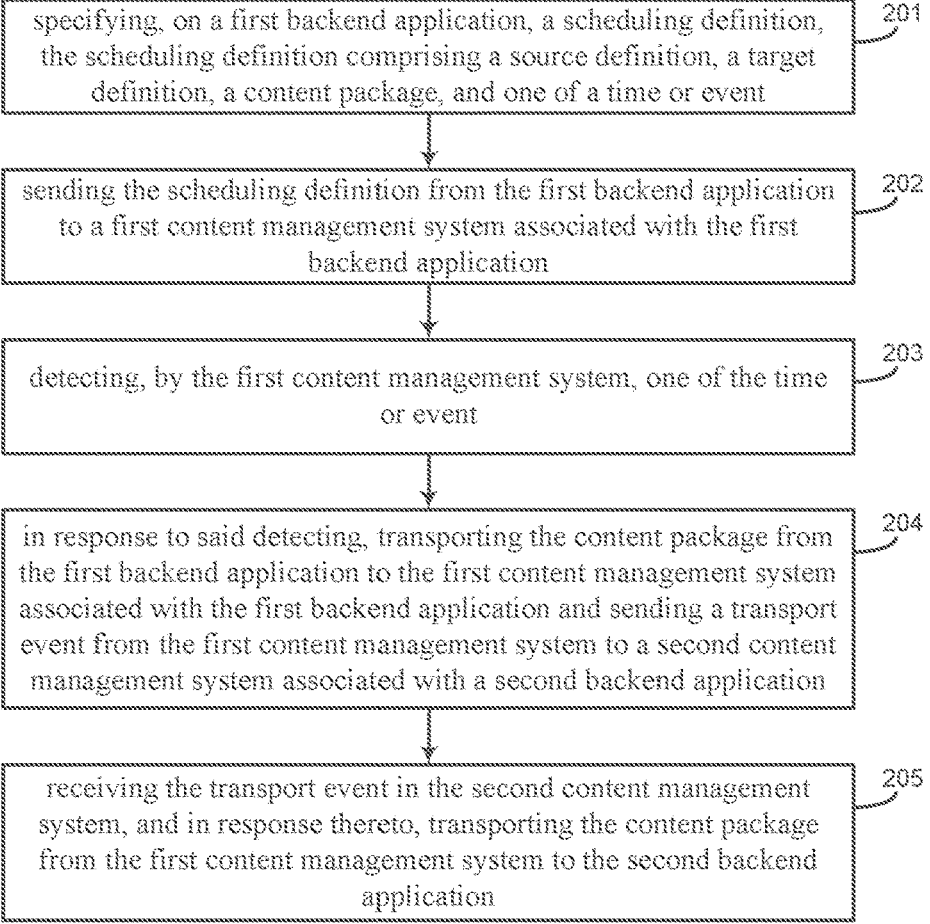
FIG. 2 illustrates a method for automated movement of data across computer systems according to an embodiment.

FIG. 2 illustrates a method for automated movement of data across computer systems according to an embodiment. At 201, a scheduling definition is specified on a first backend application. The scheduling definition comprising a source definition, a target definition, and one of a time or event, and is associated with content to be moved. At 202, the scheduling definition is sent from the first backend application to a first content management system associated with the first backend application. At 203, one of the time or event is detected by the first content management system. At 204, in response to said detecting, a content package is transported from the first backend application to the first content management system associated with the first backend application and a transport event is sent from the first content management system to a second content management system associated with a second backend application. At 205, the transport event is received in the second content management system, and in response thereto, the content package is transported from the first content management system to the second backend application. In some embodiments, there may be multiple target (second) backend systems which will receive the package from the first backend system, as the system may be exporting from one system and importing to many systems.

Figures 3A, 3B, 3C, 3D:
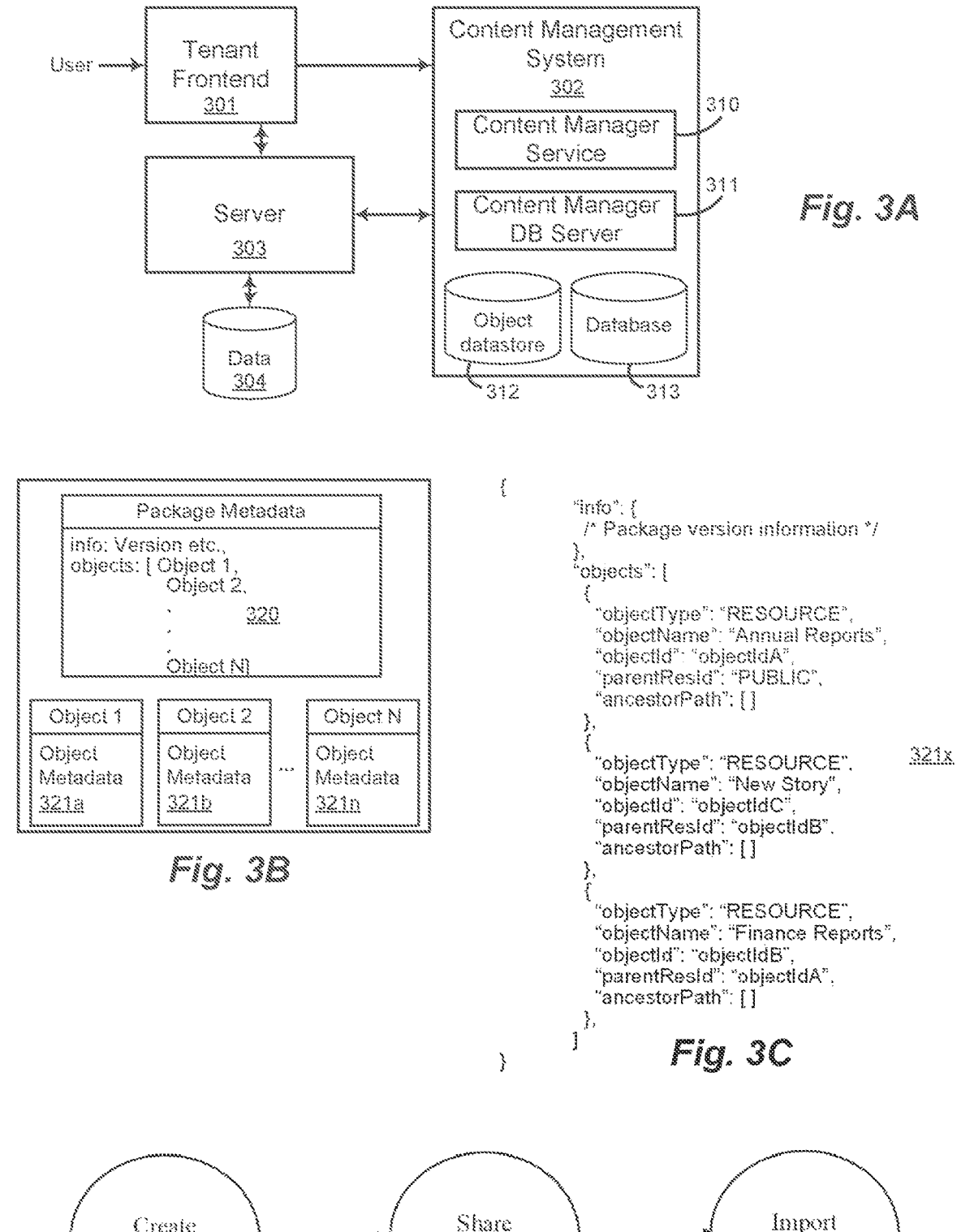
FIG. 3A illustrates an example system according to another embodiment.
FIG. 3B illustrates an example package according to an embodiment.
FIG. 3C illustrates an example data object according to an embodiment.
FIG. 3D illustrates a transport process according to an embodiment.

FIG. 3A illustrates an example database system according to another embodiment. In this example, a user accesses a content management system 302 and server 303 over a tenant frontend 301. Content management system 302 includes a content manager service 310, content manager database (DB) server 311, object datastore 312, and database 313.

The present disclosure may be used in the context of an analytics content network in a cloud computer system that combines business intelligence (BI) and planning and predictive capabilities, for example. In any business intelligence application, the analytics content (model, story, visualizations, etc.) plays the central role in discovering the unseen patterns to boost the business productivity. Hence sharing of the analytics content across users is very helpful for better collaboration. Also, a standard content template can be reused by all user by plugging their corresponding data. This infrastructure for sharing the analytics content is sometimes referred to as an "Analytical Content Network" (ACN). The content entity that contains content to be shared is called "package."

ACN may be arranged landscapes as a central component, all of which are connected. An application landscape is a coherent set of interconnected applications often within an enterprise, business, or organization, which are often associated with different geographical regions, for example. Logically ACN is "one global content network" which can provision or share any content with servers and users across landscapes. ACN may supports the following end-user workflows. A content creator creates content in the form of stories, models, dimensions, connections, Value-Driver Trees (VDT) etc. If authorized, the user can then export this content from a tenant (a portion of system resources securely assigned to a particular group) to ACN by creating a "content package," which can contain any number of these content items and share this with multiple other tenants, for example. Another SAC Content user can view all available content packages in their listing and import those packages relevant for their analytic workflows. This includes Public content (Templates or Demo content) and Private Content (shared privately with them). To achieve sharing across tenants, the content is bundled in what is referred to as a "content package" (or just, package). A package may contain the details of each object present in the package, the dependency information between those objects, and an overview which summarizes the content details, for example. Data objects are stored in datastore 312 and data describing the data objects and packages may be stored in database 313, for example. An example package is shown in FIG. 3B comprising package metadata 320, and data objects 321a-n, which include object metadata, for example. An example data object 321x is shown in FIG. 3C.

Embodiments of the present disclosure may include three steps for transportation of data content and objects across tenants as shown in FIG. 3D. At 330, a source creates a package, at 331, the source shares the package to a destination, and at 332, the target imports the package.

Figure 4A:
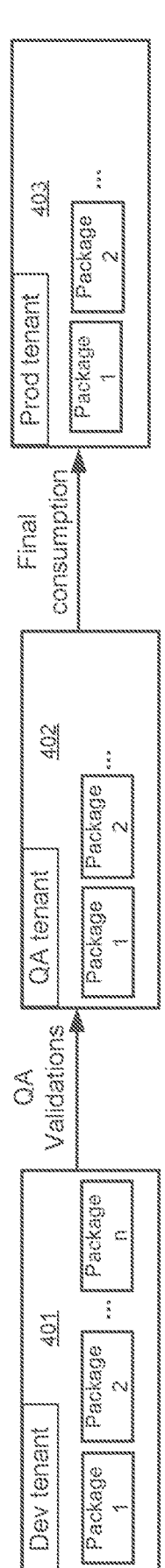
FIG. 4A illustrates an example of automated movement of data across computer systems according to an embodiment.

FIG. 4A illustrates an example of automated movement of data across computer systems according to an embodiment. In FIG. 4A, embodiments of the present disclosure may be used to automate the movement of data between a development ("Dev") environment to a quality assurance ("QA") environment and from the quality assurance environment to the production ("Prod") environment. A tenant is typically an instance of an application. In this example, there are three instances of an application (3 tenants)—development, QA, and production. Content packages may be designed in the development tenant 401 and released to a QA tenant 402. QA may validate the packages and eliminate any errors, for example. Packages on the QA tenant 402 may then be released to the production tenant 403 for use. Packages are developed, validated, and used on tenants 401, 402, and 403, respectively on backend applications, which may be associated with different content management systems. Accordingly, the process described above may allow a user in each environment to specify a source, target, time/event, and content to be automatically moved between systems using the techniques described above.

Figure 4B:
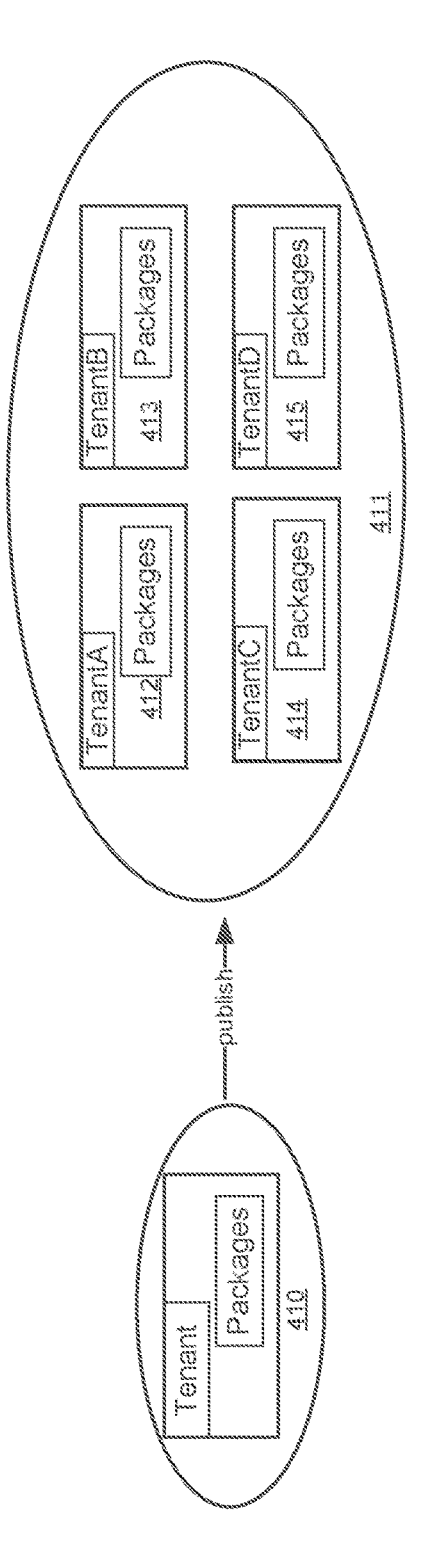
FIG. 4B illustrates an example of automated movement of data across computer systems according to another embodiment.

FIG. 4B illustrates an example of automated movement of data across computer systems according to another embodiment. In this example, packages on tenant 410 are released (aka, published) to multiple tenants 412-415. Packages on tenants 412-415 may be moved automatically using the techniques described herein. In some embodiments, tenants 412-415 may be on the same landscape (region) or on a common line of business (e.g., using a particular application type such as Concur® or Successfactors®).

Figure 5A:
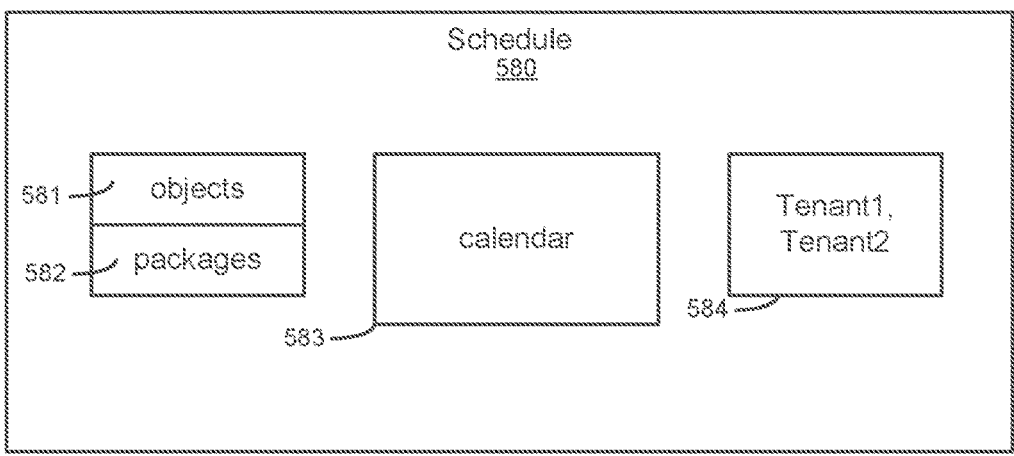
FIG. 5A illustrates an example user interface according to an embodiment.

FIG. 5A illustrates an example user interface (UI) according to an embodiment. In this example, a user of a frontend is presented with a schedule UI 580 to create a schedule definition. Schedule UI 580 allows a user to select objects 580 to create packages or currently existing packages 582. UI 580 may include a calendar to set a time (date, day of the week or month, and time during the day). UI 580 also allows a user to specify destinations at 584 (e.g., tenant1 and tenant2)

Figure 5B:
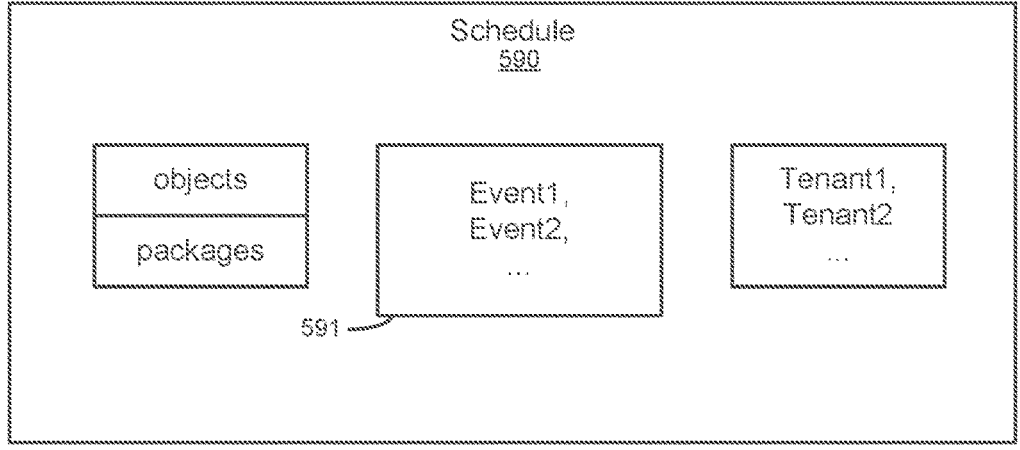
FIG. 5B illustrates an example user interface according to another embodiment.

FIG. 5B illustrates an example user interface according to another embodiment. In this example, a UI 590 allows a user to select content, sources, and destinations as before, but the calendar is replaced with an event specification UI component 591 allowing the user to specify events that trigger automated movement of content across systems, for example.

Figure 6A:
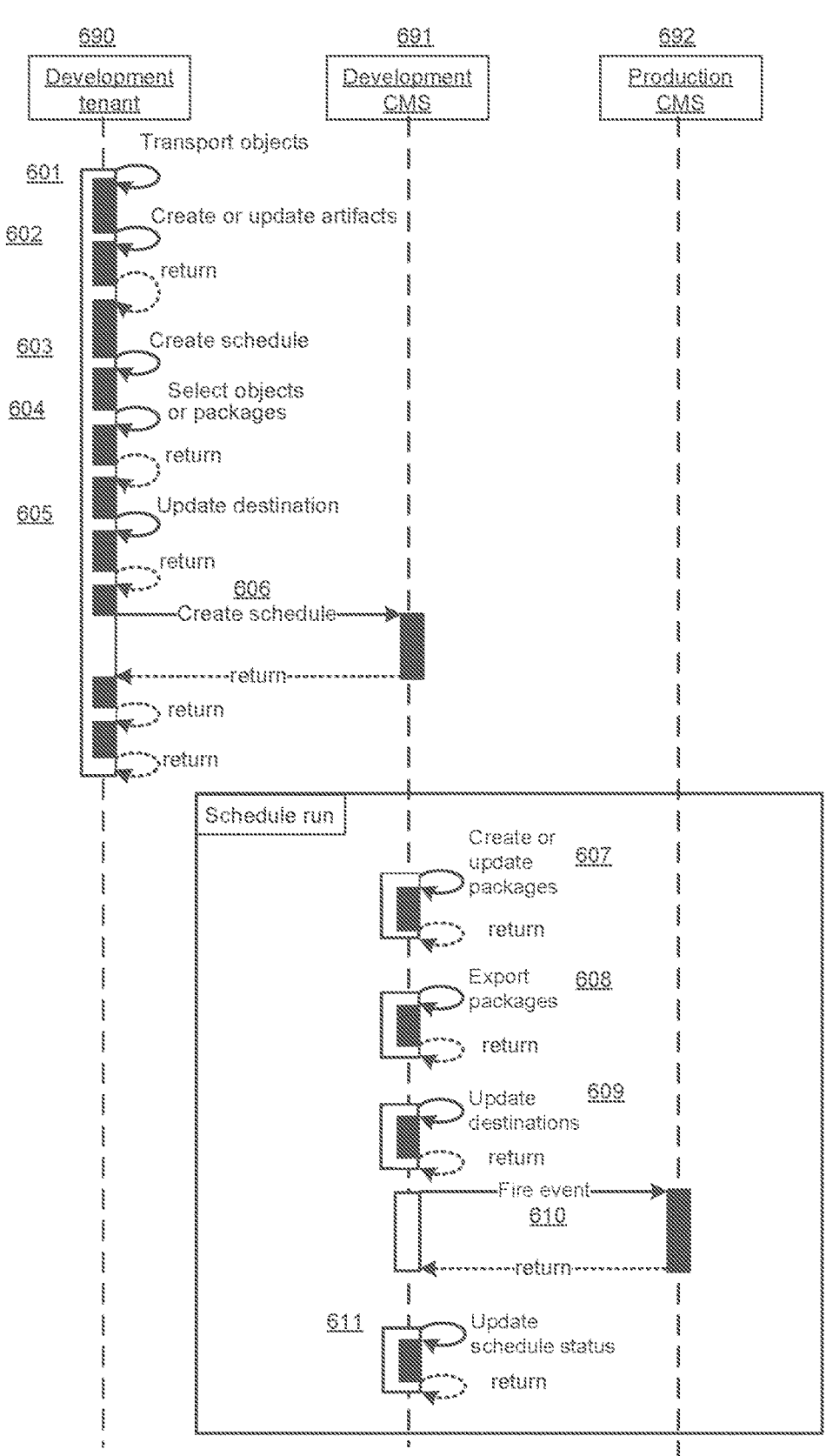
FIG. 6A illustrates an example process for automated movement of data across computer systems according to an embodiment.

FIG. 6A illustrates an example process for automated movement of data across computer systems according to an embodiment. In this example, content is transferred from a development tenant backend server 690 to a development content management system (CMS) 691 and an event is sent to a production CMS 692. At 601 a user starts the transport object process flow. At 602, artifacts (content) to be transported are created or updated. At 603, a schedule definition is created. At 604, objects or packages to be associated with the schedule definition are selected. At 605, a destination is specified. At 606, the schedule definition is sent to development CMS 691. In this example, a user specifies a particular time. Accordingly, CMS 691 waits for the time and starts execution of the transport when the time is triggered. At 607, a content package is created or updated. At 608 the package is exported from development tenant 690 to CMS 691. At 608, the destination is updated. At 610, an event is sent to production CMS 692. At 611, the status of the schedule definition is updated based on the return from the production CMS 692, for example.

Figure 6B:
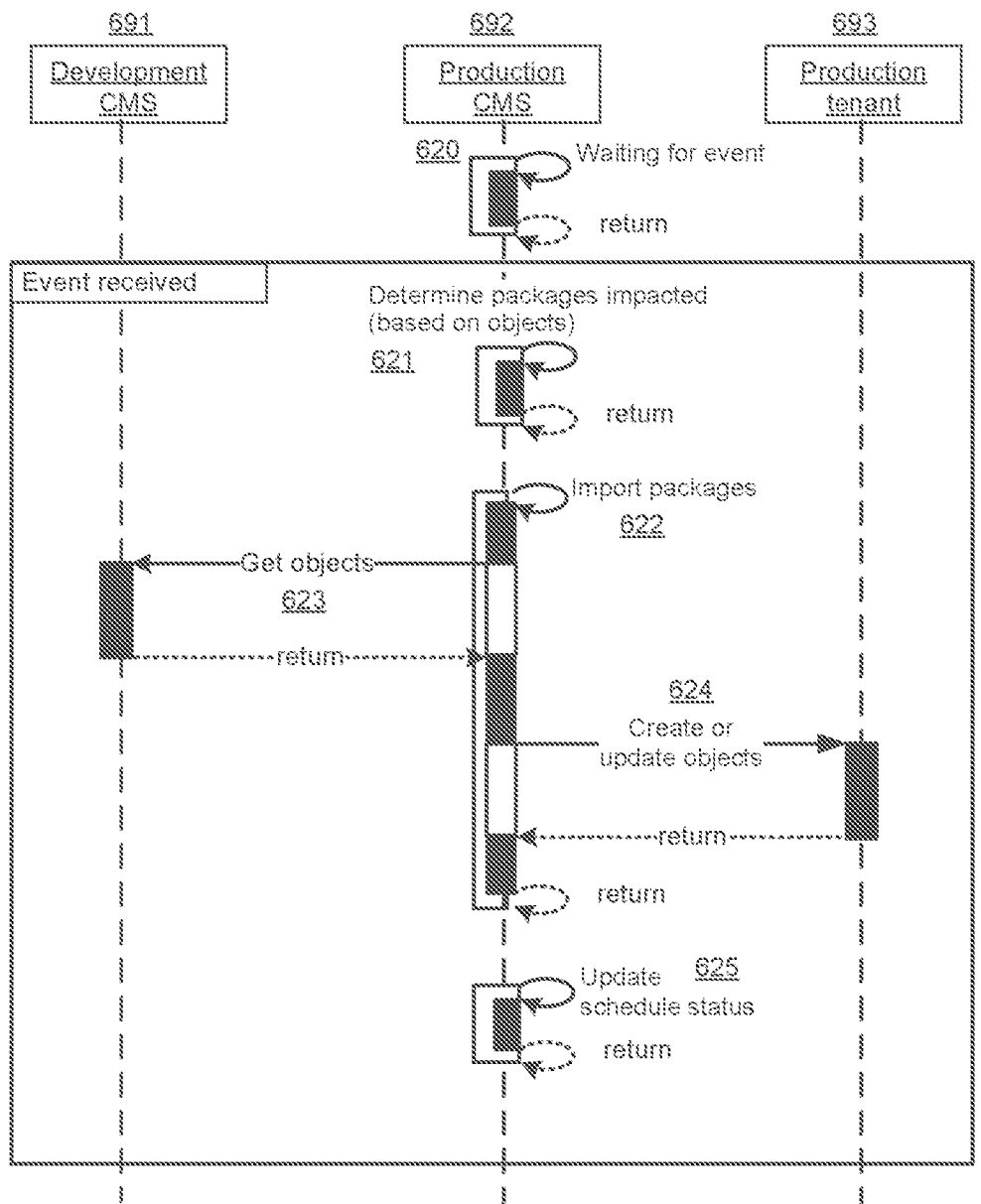
FIG. 6B further illustrates the example process of FIG. 6A according to an embodiment.

FIG. 6B further illustrates the example process of FIG. 6A according to an embodiment. Production CMS 692 waits to an event at 620. Once production CMS 692 receives the event from development CMS 691, it determines packages impacted by the event at 621. At 622, production CMS 692 starts importing packages. At 623, production CMS 692 gets objects associated with the content package from development CMS 691. At 624, production CMS creates or updates objects in production tenant backend applications server 693. At 625, the schedule status is updated.

Figure 7A:
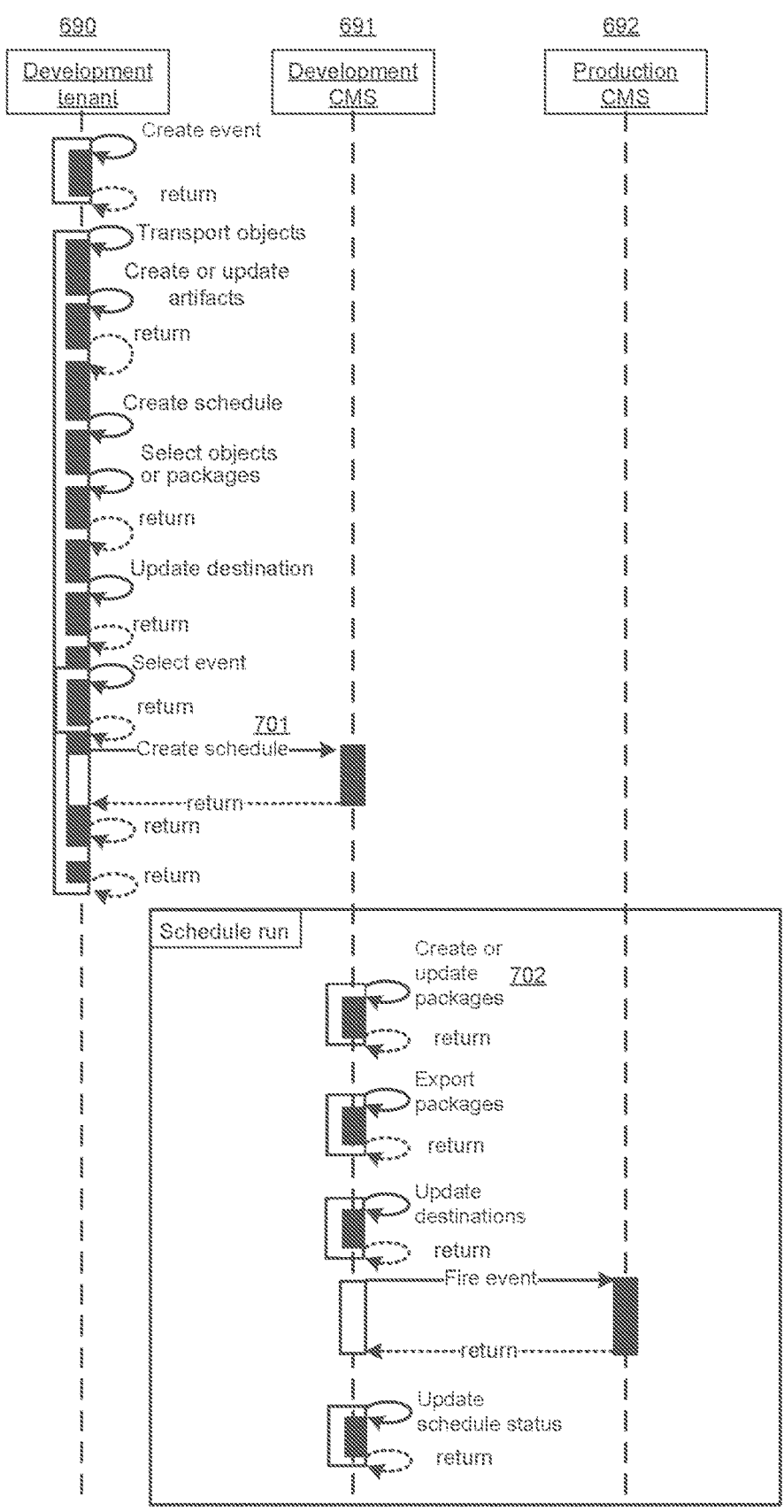
FIG. 7A illustrates another example process for automated movement of data across computer systems according to an embodiment.

FIG. 7A illustrates another example process for automated movement of data across computer systems according to an embodiment. In this example, the user specifies an event rather than a time. The process is substantially the same as in FIG. 6A except that at 701 the user specifies the event when creating the schedule definition. Additionally, development CMS 691 starts creating or updating packages at 702 in response to detecting the occurrence of the event.

Figure 7B:
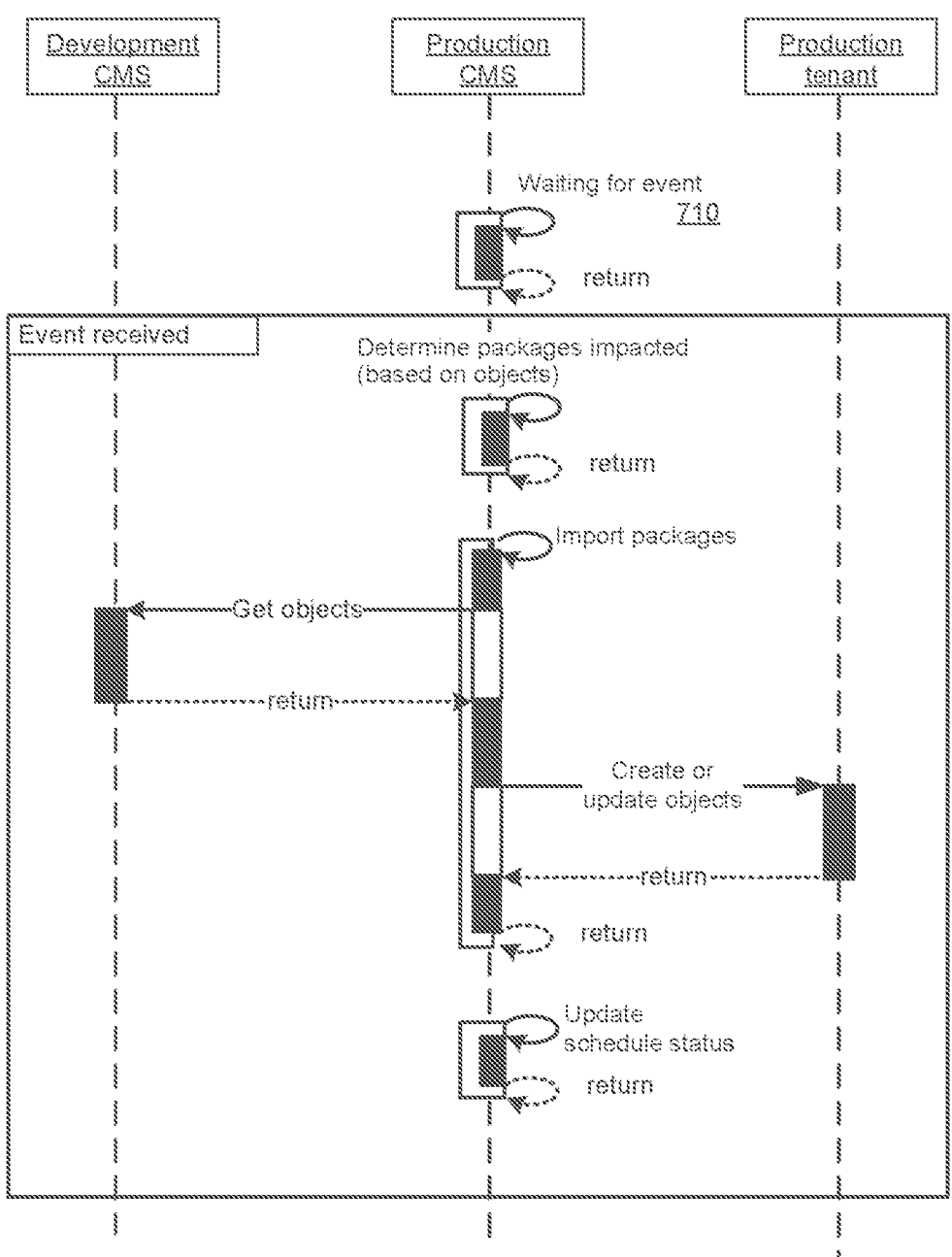
FIG. 7B further illustrates the example process of FIG. 7A according to an embodiment.

FIG. 7B further illustrates the example process of FIG. 7A according to an embodiment. The process is substantially the same as in FIG. 6B except that at 710 the production CMS is waiting for an event.

Figure 8:
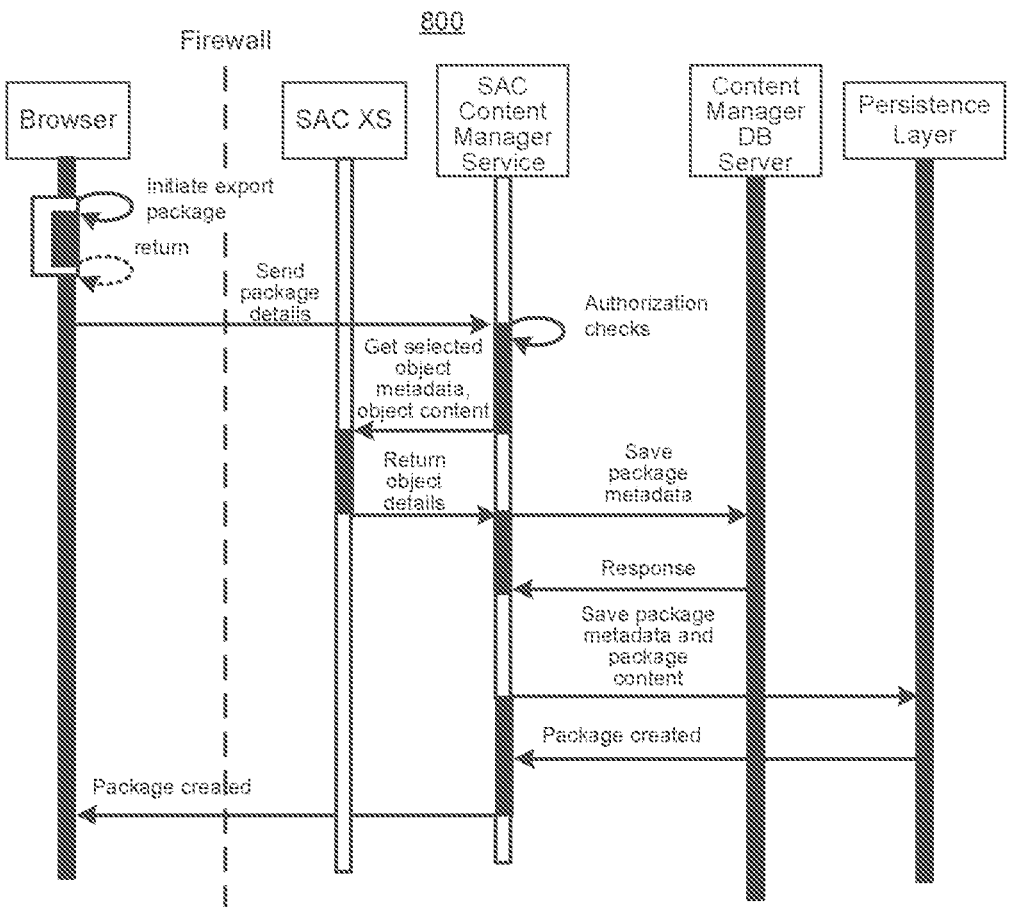
FIG. 8 illustrates an example data export process according to an embodiment.
Figure 9:
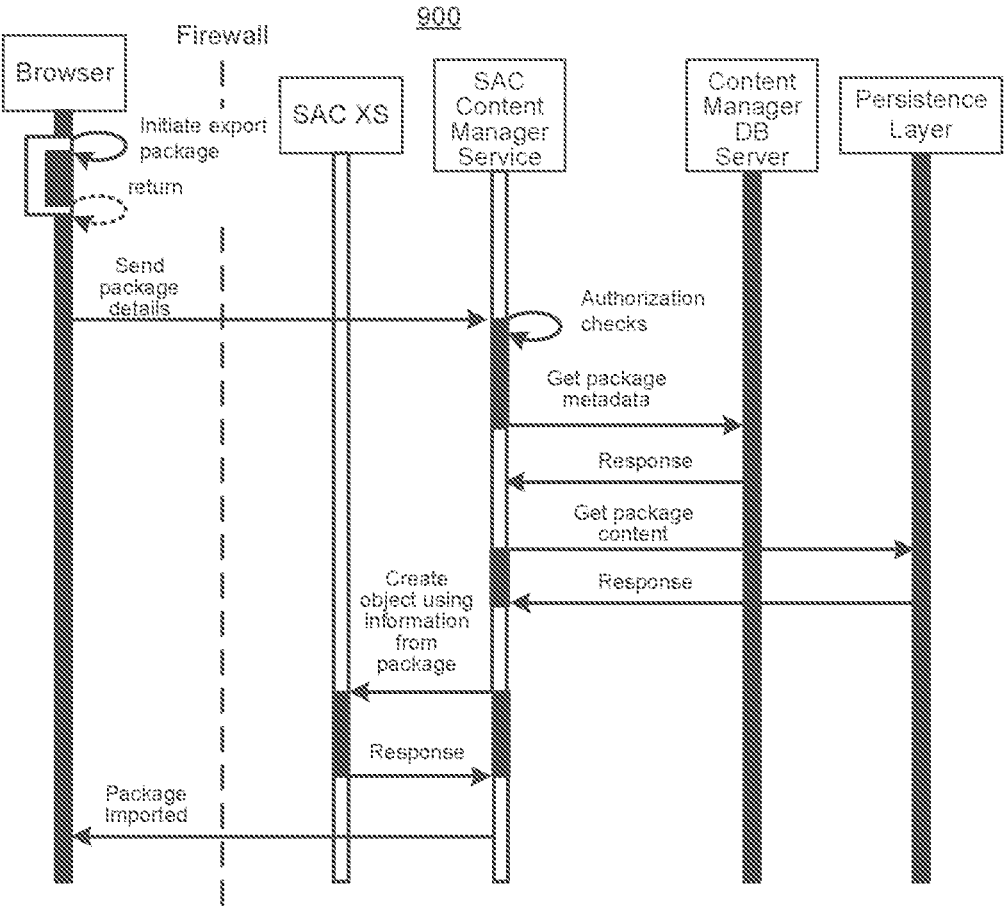
FIG. 9 illustrates an example data import process according to an embodiment.

FIG. 8 illustrates an example data export process according to an embodiment. FIG. 9 illustrates an example data import process according to an embodiment. Data export process 800 and data import process 900 may operate as described in concurrently filed U.S. patent application Ser. No. 18/531,289, entitled "SYSTEMS AND METHODS FOR PARALLEL TRANSPORT OF DATA BETWEEN COMPUTER SYSTEMS," the entire disclosure of which is hereby incorporated herein by reference.

Figure 10:
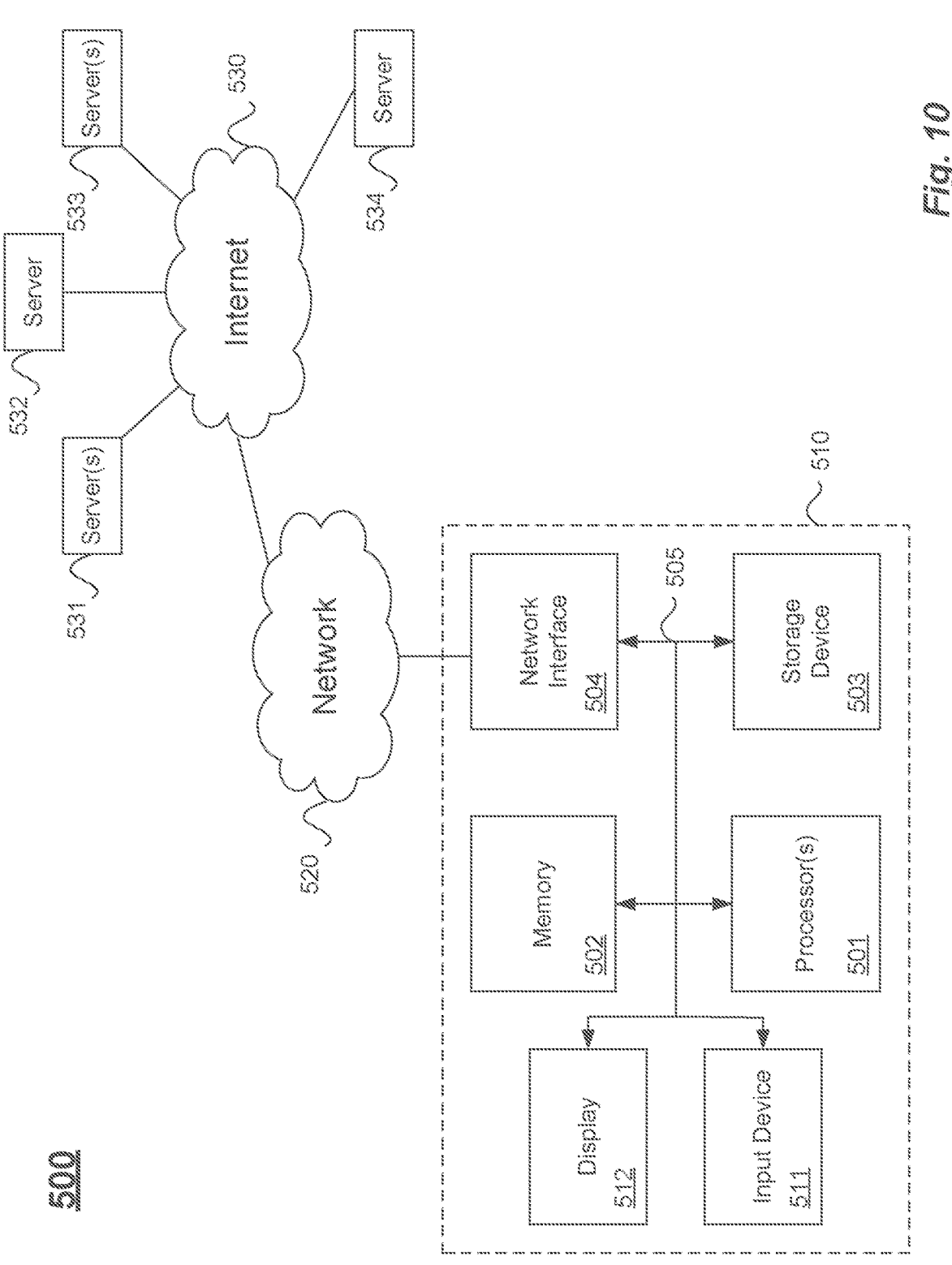
FIG. 10 illustrates hardware of a special purpose computing system configured according to the above disclosure.

FIG. 10 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method as described herein and in the following examples. In another embodiment, the present disclosure includes a non-transitory computer-readable medium storing computer-executable instructions that, when executed by at least one processor, perform a method as described herein and in the following examples.

In some embodiments, the present disclosure includes a method of automated movement of data across computer systems comprising: specifying, on a first backend application, a scheduling definition, the scheduling definition comprising a source definition, a target definition, and one of a time or event; sending the scheduling definition from the first backend application to a first content management system associated with the first backend application; detecting, by the first content management system, one of the time or event, and in response to said detecting, transporting a content package from the first backend application to the first content management system associated with the first backend application and sending a transport event from the first content management system to a second content management system associated with a second backend application; and receiving the transport event in the second content management system, and in response thereto, transporting the content package from the first content management system to the second backend application.

In some embodiments, the scheduling definition comprises a user specified time, and wherein the first backend application detects the user specified time, and in response thereto, performs said transporting the content package and sending the transport event steps.

In some embodiments, the user specified time causes the first backend application to perform said transporting the content package and sending the transport event steps at regular time intervals.

In some embodiments, the scheduling definition comprises a user selected event from a plurality of predefined events on the first backend application, and wherein the first backend application detects the user selected event, and in response thereto, performs said transporting the package and sending the transport event steps.

In some embodiments, transporting the content package from the first content management system to the second backend application comprising: retrieving, by second content management system, the content package from the first content management system; and sending the content package from the second content management system to the second backend application.

In some embodiments, the content package comprises new content.

In some embodiments, the content package comprises updated content.

In some embodiments, the first backend application and the first content management system correspond to a development tenant and the second backend application and the second content management system correspond to a quality assurance tenant.

In some embodiments, the first backend application and the first content management system correspond to a quality assurance tenant and the second backend application and the second content management system correspond to a production tenant.

In some embodiments, the first backend application and the first content management system and the second backend application and the second content management system are part of a same tenant.

In some embodiments, the first backend application and the second backend application correspond to different instances of a same backend application.

In some embodiments, the first backend application and the second backend application correspond to different backend applications.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of automated movement of data across computer systems comprising:

specifying, on a first backend application, a scheduling definition, the scheduling definition comprising a source definition of a content package, a target definition of the content package, and one of a time or event;

sending the scheduling definition from the first backend application to a first content management system associated with the first backend application;

detecting, by the first content management system, one of the time or event, and in response to said detecting, transporting the content package from the first backend application to the first content management system associated with the first backend application and sending a transport event from the first content management system to a second content management system associated with a second backend application, wherein the first backend application and the first content management system correspond to a development tenant and the second backend application and the second content management system correspond to a quality assurance tenant; and receiving the transport event in the second content management system, and in response thereto, transporting the content package from the first content management system to the second backend application.

2. The method of claim 1, wherein the scheduling definition comprises a user specified time.

3. The method of claim 2, wherein the user specified time comprises time intervals.

4. The method of claim 1, wherein the scheduling definition comprises a user selected event from a plurality of predefined events on the first backend application.

5. The method of claim 1, wherein transporting the content package from the first content management system to the second backend application comprising:

retrieving, by second content management system, the content package from the first content management system; and sending the content package from the second content management system to the second backend application.

6. The method of claim 1, wherein the content package comprises new content.

7. The method of claim 1, wherein the content package comprises updated content.

8. The method of claim 1, wherein the first backend application and the first content management system and the second backend application and the second content management system are part of a same tenant.

9. The method of claim 1, wherein the first backend application and the second backend application correspond to different instances of a same backend application.

10. The method of claim 1, wherein the first backend application and the second backend application correspond to different backend applications.

11. A computer system comprising:

at least one processor;

at least one non-transitory computer readable medium storing computer executable instructions that, when executed by the at least one processor, cause the computer system to perform a method of automated movement of data across computer systems comprising:

specifying, on a first backend application, a scheduling definition, the scheduling definition comprising a source definition of a content package, a target definition of the content package, and one of a time or event;

sending the scheduling definition from the first backend application to a first content management system associated with the first backend application;

detecting, by the first content management system, one of the time or event, and in response to said detecting, transporting the content package from the first backend application to the first content management system associated with the first backend application and sending a transport event from the first content management system to a second content management system associated with a second backend application, wherein the first backend application and the first content management system correspond to a quality assurance tenant and the second backend application and the second content management system correspond to a production tenant; and receiving the transport event in the second content management system, and in response thereto, transporting the content package from the first content management system to the second backend application.

12. The computer system of claim 11, wherein the scheduling definition comprises a user specified time.

13. The computer system of claim 11, wherein the scheduling definition comprises a user selected event from a plurality of predefined events on the first backend application.

14. The computer system of claim 11, wherein transporting the content package from the first content management system to the second backend application comprising:

retrieving, by second content management system, the content package from the first content management system; and sending the content package from the second content management system to the second backend application.

15. A non-transitory computer-readable medium storing computer-executable instructions that, when executed by at least one processor, perform a method of automated movement of data across computer systems, the method comprising:

specifying, on a first backend application, a scheduling definition, the scheduling definition comprising a source definition of a content package, a target definition of the content package, and one of a time or event;

sending the scheduling definition from the first backend application to a first content management system associated with the first backend application;

detecting, by the first content management system, one of the time or event, and in response to said detecting, transporting the content package from the first backend application to the first content management system associated with the first backend application and sending a transport event from the first content management system to a second content management system associated with a second backend application, wherein the first backend application and the first content management system correspond to a development tenant and the second backend application and the second content management system correspond to a quality assurance tenant; and receiving the transport event in the second content management system, and in response thereto, transporting the content package from the first content management system to the second backend application.

16. The non-transitory computer-readable medium of claim 15, wherein the scheduling definition comprises a user specified time.

17. The non-transitory computer-readable medium of claim 15, wherein the scheduling definition comprises a user selected event from a plurality of predefined events on the first backend application.

18. The non-transitory computer-readable medium of claim 15, wherein transporting the content package from the first content management system to the second backend application comprising:

retrieving, by second content management system, the content package from the first content management system; and sending the content package from the second content management system to the second backend application.

* * * * *